United States Patent [19]
Oh

[11] Patent Number: 5,845,051
[45] Date of Patent: Dec. 1, 1998

[54] LEARNING METHOD FOR MULTILAYER PERCEPTRON NEURAL NETWORK WITH N-BIT DATA REPRESENTATION

[75] Inventor: Sang-Hoon Oh, Daejeon, Rep. of Korea

[73] Assignee: Electronics and Telecommunications Research Institute, Daejeon, Rep. of Korea

[21] Appl. No.: 712,409

[22] Filed: Sep. 11, 1996

[30] Foreign Application Priority Data

Sep. 15, 1995 [KR] Rep. of Korea .................. 1995 30291

[51] Int. Cl.$^6$ ............................... G06F 1/00; G06F 15/18
[52] U.S. Cl. ................................ 395/23; 395/21
[58] Field of Search ................................. 395/20–25, 27; 382/155–161

[56] References Cited

U.S. PATENT DOCUMENTS

| | | | |
|---|---|---|---|
| 5,253,330 | 10/1993 | Ramacher et al. | 395/27 |
| 5,278,945 | 1/1994 | Basehore et al. | 395/27 |
| 5,479,579 | 12/1995 | Duong et al. | 395/22 |
| 5,524,175 | 6/1996 | Sato et al. | 395/11 |

OTHER PUBLICATIONS

Holt et al, "Finite Precision Error Analysis of Neural Network Hardware Implementations", IEEE Trans. Comp., vol. 42, pp. 281–290, Mar. 1993.

Sakaue et al, "Reduction of Required Precision Bits for Back–Propagation Applied to Pattern Recognition", IEEE Trans. Neural Networks, vol. 4, pp. 270–275, Mar. 1993.

*Primary Examiner*—Tariq R. Hafiz
*Attorney, Agent, or Firm*—Nixon & Vanderhye P.C.

[57] ABSTRACT

A multilayer perceptron neural network with N-bit (8-bit) data representation generates weighted sums in forward and backward calculations having 2N-bit data precision. During N-bit digital learning of a multilayer perceptron, the maximum value represented with N-bits is set to a value corresponding to the sigmoidal saturated region when the result of the weighted sum having 2N-bit data precision in the forward calculation of the multilayer perceptron is represented with N-bit data for a sigmoidal nonlinear transformation. The maximum value of N-bit presentation is set to a value comparatively smaller than that represented in 2N bits when the result of the weighted sum having the 2N-bit data precision in the backward calculation of the multilayer perceptron is represented with N-bit data. With the representation range of the weights being small, if a predetermined ratio of the weights approaches a maximum value according to the learning progress, the weight range is expanded. The efficiency of 8-bit digital learning can be enhanced to approach that of 16-bit digital learning.

7 Claims, 4 Drawing Sheets

LEARNING METHOD FOR MULTILAYER PERCEPTRON NEURAL NETWORK WITH N-BIT DATA REPRESENTATION

BACKGROUND OF THE INVENTION

The present invention relates to a learning method for a Multilayer Perceptron neural network with N-bit (especially, 8-bit) data representation for drastic reduction of hardware system cost for Multilayer Perceptron neural network models widely used in pattern recognition learning.

Neural networks are widely used for pattern recognition and Multilayer Perceptrons are the most popular among neural network models. When implementing neural networks with fixed point digital hardware, we need to determine the required number of precision bits for learning since finite precision is prone to errors in implementation.

Recently, it was shown that 16 bits of data precision is necessary for learning of Multilayer Perceptrons for pattern classification problems. Reducing the number of precision bits for learning, if possible, results in a drastic reduction in system cost.

To explain the present invention, the following terms will now be defined.

First, a Multilayer Perceptron is a neural network model simulating bio-information processing, and has a hierarchical structure with nodes representing neurons and synaptic weights for connecting the nodes (FIG. 1). In FIG. 1, $x_j^{(l)}$ denotes the jth node in layer l and $w_{ji}^{(l)}$ denotes the weight connecting $x_i^{(l-1)}$ to $x_j^{(l)}$ Each node of the Multilayer Perceptron receives a weighted sum of the node values in lower layers and the weights thereof connected as their inputs and generates a sigmoidally transformed value as its output, as shown in FIG. 2. The sigmoidal function can be divided into a double-sided saturated region with a small gradient and a central active region.

Training patterns are patterns randomly selected in order to train Multilayer Perceptrons for classification problems. Test patterns are patterns randomly selected for testing the generalization capacity of the Multilayer Perceptron. The pattern classification is to determine to which class an input pattern belongs. In Multilayer Perceptrons, the nodes in the final layer, so called "output layer", represent the class to which the input pattern belongs.

A Error Back-Propagation algorithm is a way by which the Multilayer Perceptron is trained by iterative updating of the weights according to error signals, which is the negative gradient of an error function.

An error function is a function that determines how close the actual output values of nodes in an output layer are to the desired output values associated with an input pattern.

In pattern classification applications, the desired output value of a Multilayer Perceptron is one of the two extreme values of the sigmoid function. If the actual output value of any output node is near the wrong extreme value, the node is called "incorrectly saturated".

Based on the above-definition terms, the Error Back-Propagation algorithm of a Multilayer Perceptron with L layers will now be described with reference to FIG. 3.

When a training pattern $x_p$ is presented to the Multilayer Perceptron (step 1) and propagated forward to determine the output signal (step 2), the state of the jth node in layer n is $$x_j^{(n)} = f(a_j^{(n)}) = \frac{2}{1 + \exp[-a_j^{(n)}]} - 1$$

where the weighted sum $a_j^{(n)} = w_{j0}^{(n)} + \Sigma_{i=1}^{N_{n-1}} w_{ji}^{(n)} x_i^{(n-1)}$. Here, $w_{j0}^{(n)}$ denotes a bias of $x_j^{(n)}$ and $N_{n-1}$ is the number of nodes in the (n−1)th layer.

The conventional mean-squared error function is $$E_m(x_p) = \frac{1}{2} \sum_{k=1}^{N_L} (t_k - x_k^{(L)})^2,$$

where $t_k$ is the desired output value associated with an input pattern $x_p$.

To minimize $E_m(x_p)$, each weight is updated by an amount proportional to the partial derivative of $E_m(x_p)$ with respect to the weight. Therefore, the weight $w_{ji}^{(n)}$ is updated by (step 5)

$$\Delta w_{ji}^{(n)} = -\eta \frac{\partial E_m(x_p)}{\partial w_{ji}^{(n)}} = \eta \delta_j^{(n)} x_i^{(n-1)}$$

Here, $\delta_j^{(n)}$ is the error signal and n is the learning rate. When n=L, the error signal in the output layer is (step 3)

$$\delta_k^{(L)} = -\frac{\partial E_m(x_p)}{\partial x_k^{(L)}} \frac{\partial x_k^{(L)}}{\partial a_k^{(L)}} = (t_k - x_k^{(L)}) \frac{(1 - x_k^{(L)})(1 + x_k^{(L)})}{2}$$

When $1 \leq n < L$, the error signal of layer n is (step 4)

$$\delta_j^{(n)} = -\frac{\partial E_m(x_p)}{\partial x_j^{(n)}} \frac{\partial x_j^{(n)}}{\partial a_j^{(n)}} = \frac{(1 - x_j^{(n)})(1 + x_j^{(n)})}{2} \sum_{k=1}^{N_{n+1}} w_{kj}^{(n+1)} \delta_k^{(n+1)}$$

which is called "back-propagated error signal".

After the training of a Multilayer Perceptron for a specific input pattern, the next training pattern is presented to the network or the training is terminated (step 6).

The error function for all training patterns is defined as $$E_m = \frac{1}{P} \sum_{p=1}^{P} E_m(x_p)$$

where P denotes the number of training patterns. The iterative updating of weights for all training patterns will minimize $E_m$. Here, we use the term "sweep" to denote that weights are updated once for all training patterns respectively.

In the above-described Error Back-Propagation algorithm, the error signal in the output layer, $\delta_k^{(L)}$, is the difference between the actual and desired output values multiplied by the gradient of sigmoid activation function.

If $x_k^{(L)}$ approaches one of the two exterme values of sigmoid function (−1 or +1), the value of $\delta_k^{(L)}$ approaches zero due to the gradient factor. Therefore, the output node $x_k^{(L)}$ which has an exterme value opposite $t_k$ cannot make a strong error signal for adjusting the weights significantly. This incorrect saturation of output nodes retards the search for a minimum in the error surface.

Since the gradient factor is maximally ½ it always reduces the error signal and increases the underflow error in fixed-point digital hardware which means that multiplication of two small values becomes zero because of truncation. Thus, it is preferred that the error signal is only proportional to the difference between the actual and desired output values of the output nodes.

Recently, a cross-entropy error function has been defined as $$E_c(x_p) = -\Sigma_{k=1}^{N_L}[(1+t_k)\ln(1+x_k^{(L)}) + (1-t_k)\ln(1-x_k^{(L)})].$$

Using the error function, the error signal of the output layer is changed into $$\delta_k^{(L)} = (t_k - x_k^{(L)}).$$

The other equations for updating the weights are the same as the ones in the Error Back-Propagation algorithm using the mean-squared error function. Using the cross-entropy error function, the incorrectly saturated output node generates a strong error signal to escape incorrect saturation. The error signal without the slope term, also, reduces underflow error due to truncation in a fixed-point digital machine.

When implementing the above-described learning method with digital hardware using N-bit numerical precision, there may be underflow error, which means that a smaller value than the available level of numerical precision is represented with "0", and overflow error, which means that the digital hardware cannot represent a larger value than the maximum error produced using N-bit data representation. These errors are prone to performance degradation with insufficient precision of the utilized digital hardware.

SUMMARY OF THE INVENTION

To solve the above-described problems, it is, therefore, an object of the present invention to provide a learning method Multilayer Perceptron neural networks with N-bit numerical precision by efficiently minimizing under/overflow errors.

In achieving the above object, a feature of the learning method the present invention is that, firstly, an accumulator for the weighted sum in forward and backward calculation has a 2N-bit data representation; secondly, in the forward propagation of node values to determine output values, the weighted sum result with 2N-bit representation is converted into one with N-bit representation within the maximum value which is in the saturated region of the sigmoid function; thirdly, in the back-propagation of error signals, the weighted sum result with 2N-bit representation is converted into one with N-bit representation within the range which is smaller than that of 2N-bit data representation; and fourthly, the Multilayer Perceptron is initialized with quantized weights within a small range and the range of weights is enlarged when a predetermined ratio of weights are out of the range during the learning process.

BRIEF DESCRIPTION OF THE DRAWINGS

The above objects and advantages of the present invention will become more apparent by describing in detail a preferred embodiment thereof with reference to the attached drawings in which:

FIGS. 5A and 5B show simulation results of handwritten digit recognition according to the embodiment shown in FIG. 4, in which FIG. 5A shows an average value of recognition ratios for training patterns after four simulations, and FIG. 5B shows an average value of recognition ratios for test patterns after four simulations.

DETAILED DESCRIPTION OF THE INVENTION

Figure 1:
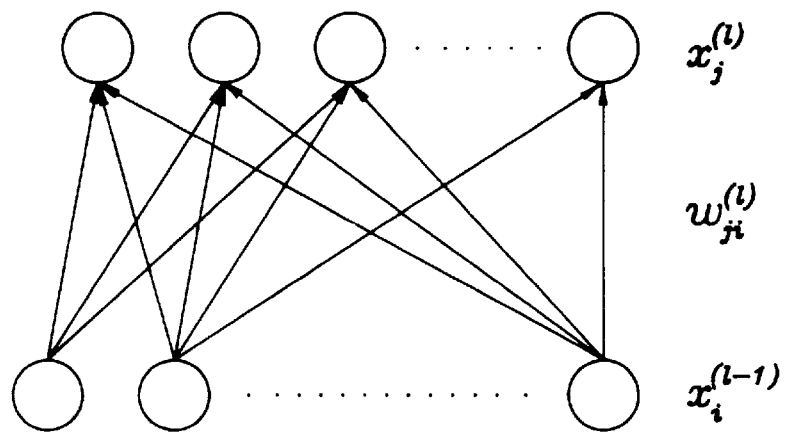
FIG. 1 is a schematic diagram of a Multilayer Perceptron neural network.
Figure 2:
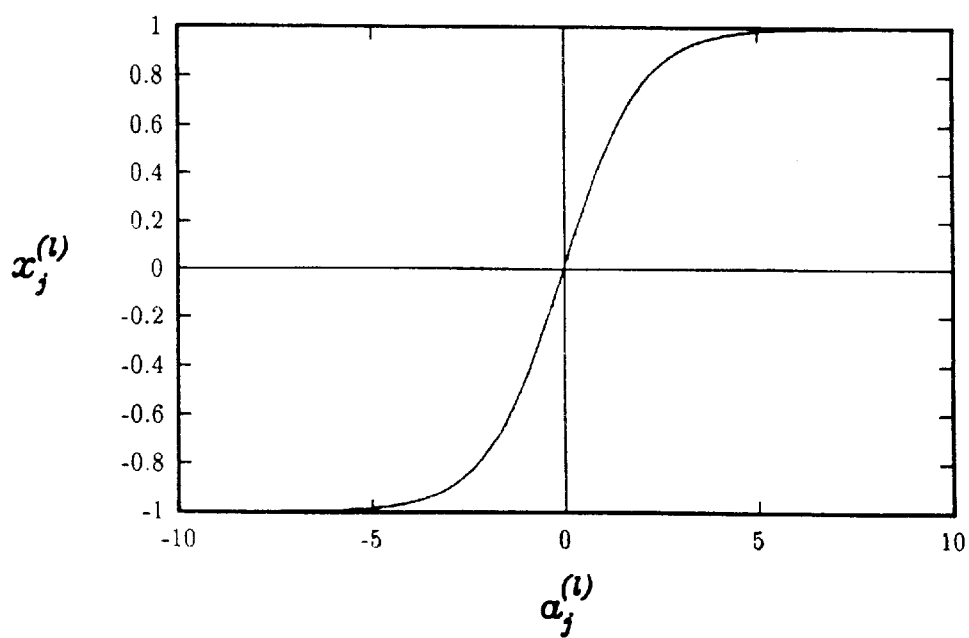
FIG. 2 shows a sigmoidal (S-shaped) activation function.
Figure 3:
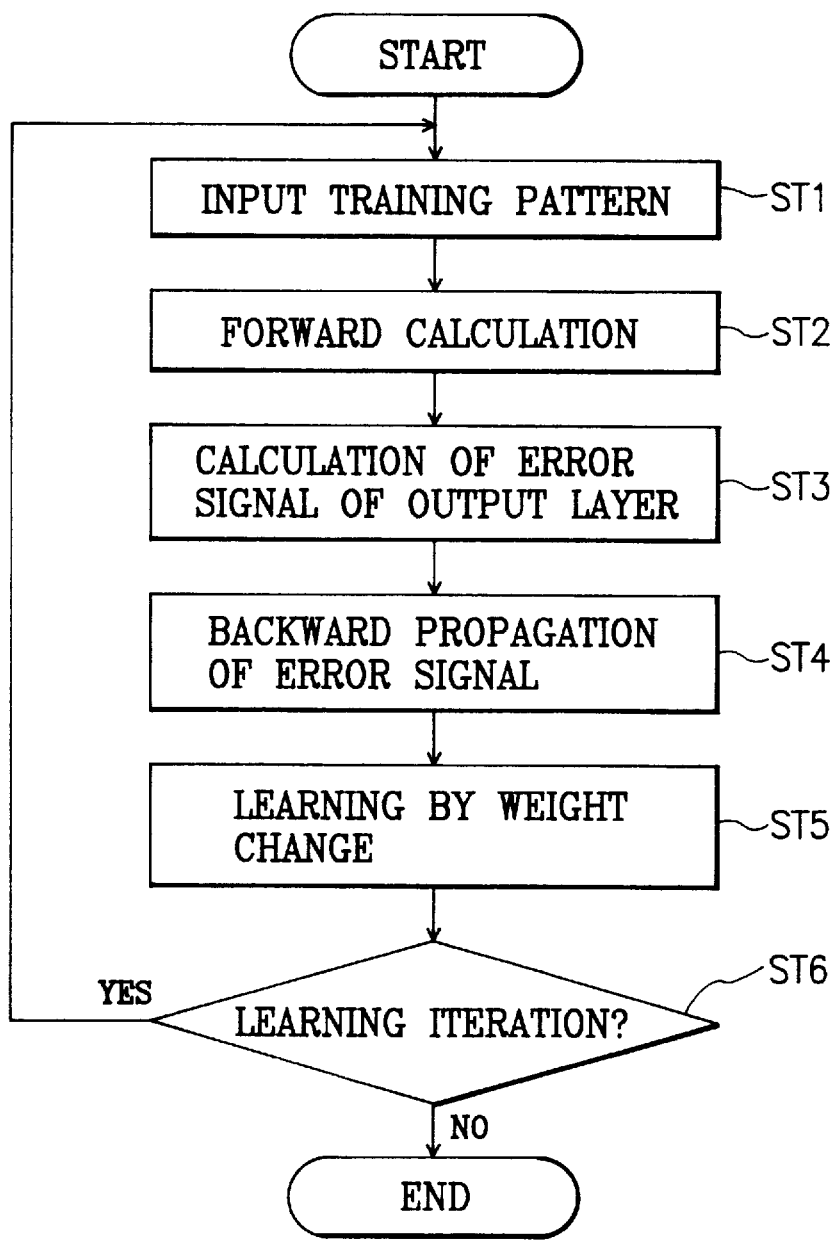
FIG. 3 is a flowchart showing a conventional Error Back-Propagation algorithm for Multilayer Perceptrons.

The learning method of Multilayer Perceptrons with N-bit data representation, according to an embodiment of the present invention, will now be described with reference to FIG. 4, using the following equations.

Assuming that the maximum value of the weights of the nth layer in the Multilayer Perceptron with N-bit data precision is $W_{max}^{(n)}$, $w_{ji}^{(n)}$'s are represented with integer times of $W_{max}^{(n)}/2^{N-1}-1$, which is the precision of N-bit representation.

To prevent overflows which can occur during the weighted sum in forward propagation of node values or backward propagation of error signals, 2N bits are designated to accumulate the summation of N-bit weighted signals.

In the forward propagation of node values, the maximum value of the weighted sum $a_j^{(n)}$ which can be represented with 2N-bit accumulator is $$(2^{2N-1} - 1) \times \frac{W_{max}^{(n)}}{2^{N-1} - 1} \approx 2^N W_{max}^{(l)},$$

since the precision of N-bit multiplication of $w_{ji}^{(n)}$ by $x_i^{(n-1)}$ is $W_{max}^{(n)}/2^{N-1}-1$. Thus, we can do the weighted sums without overflows under the condition that $(1+N_{n-1}) \leq 2^N$ since $a_j^{(n)} \leq (1+N_{n-1})W_{max}^{(n)}$.

Before the sigmoid transformation of $a_j^{(n)}$ using the look-up table with $2^N$ entries, $a_j^{(n)}$ with 2N-bit precision should be converted into one with N-bit precision.

Since the sigmoid transformation has a saturation property, the weighted sums in the saturation region have similar values after the sigmoid transformations. Thus, the weighted sums with 2N-bit precision is truncated into the value on [−10, +10] and the truncated value is converted into one with N-bit precision. The truncation will alleviate the data loss due to the degradation of precision from 2N bits to N bits.

After the forward propagation to determine the values of output nodes in the final layer according to the aforementioned method, the weights associated with the output layer are updated by the error signal $(t_k - x_k^{(L)})$.

For updating the weights of a lower layer, the error signals of output nodes should be back-propagated. In this back-propagation of error signals, the 2N-bit accumulation is also used for the weighted sums of error signals.

Since the precision of N-bit multiplication of $(t_k - x_k^{(L)})$ by $w_{kj}^{(L)}$ is $$\frac{2W_{max}^{(L)}}{2^{N-1} - 1},$$

the maximum value of $\Sigma_{k=1}^{N_L} w_{kj}^{(L)}(t_k - x_k^{(L)})$ which can be represented with 2N bits is $$(2^{2N-1} - 1) \times \frac{2W_{max}^{(L)}}{2^{N-1} - 1} \approx 2^{N+1} \times W_{max}^{(L)}.$$

Also, $\Sigma_{k=1}^{N_L} w_{kj}^{(L)}(t_k - x_k^{(L)}) < 2 \times N_L \times W_{max}^{(L)}$ makes the weighted sum without overflows when $N_L < 2^N$. Conversion of the weighted sum with 2N-bit into one with N-bit within the range which are smaller than $2N_L W_{max}^{(L)}$ will reduce the data loss due to the degradation of precision.

For optimum selection of the range, the mean $\zeta$ and standard deviation $\sigma$ of $\Sigma_{k=1}^{N_L} w_{kj}^{(L)}(t_k - x_k^{(L)})$ are derived. Here, it is assumed that $w_{kj}^{(L)}$ is uniformly distributed on $[-W_{max}^{(L)}, +W_{max}^{(L)}]$ and independent, identically distributed, and that $(t_k - x_k^{(L)})$ is uniformly distributed on $[-2, +2]$ and independent, identically distributed. It is also assumed that $w_{kj}^{(L)}$ and $(t_k - x_k^{(L)})$ are independent each other.

Under these assumptions, the mean is $\zeta = E[\Sigma_{k=1}^{N_L} w_{kj}^{(L)}(t_k - x_k^{(L)})] = \Sigma_{k=1}^{N_L} E[w_{kj}^{(L)}] E[t_k - x_k^{(L)}] = 0$ and the variance is $$\sigma^2 = \sum_{k=1}^{N_L} E[w_{kj}^{(L)2}(t_k - x_k^{(L)})^2] = \left(\frac{2W_{max}^{(L)}}{3}\right)^2 N_L.$$

Using the derived mean and variance, the weighted sum of error signals with 2N-bit is truncated into the value $[-(\zeta+3\sigma), +(\zeta+3\sigma)]$ and the truncated value is converted into one with N-bit precision. Since $\zeta + 3\sigma = 2W_{max}^{(L)}\sqrt{N_L}$ is much smaller than $2N_L W_{max}^{(L)}$, the data loss due to the degradation of precision is reduced. $w_{ji}^{(L-1)}$ is updated according to the back-propagated error signal with N-bit precision. Also, $w_{ji}^{(n)}(n<L-1)$ is updated according to the same procedure of back-propagation.

The range of initial weights should be small to avoid the premature saturation of learning which is a phenomenon that the error of neural the network stays significantly high and relatively constant for some period of time during learning. However, the small initial weights quantized with N-bits will be "0" in the case that $W_{max}^{(n)}$ is determined according to the range of weights in final stage of learning. To prevent the quantized initial weights from having zero value, we initialize the Multilayer Perceptron with quantized weights within small $W_{max}^{(n)}$ and enlarge the $W_{max}^{(n)}$ 1.5 times when 1% of the weights are $\pm W_{max}^{(n)}$ after learning of each input pattern.

Figure 4:
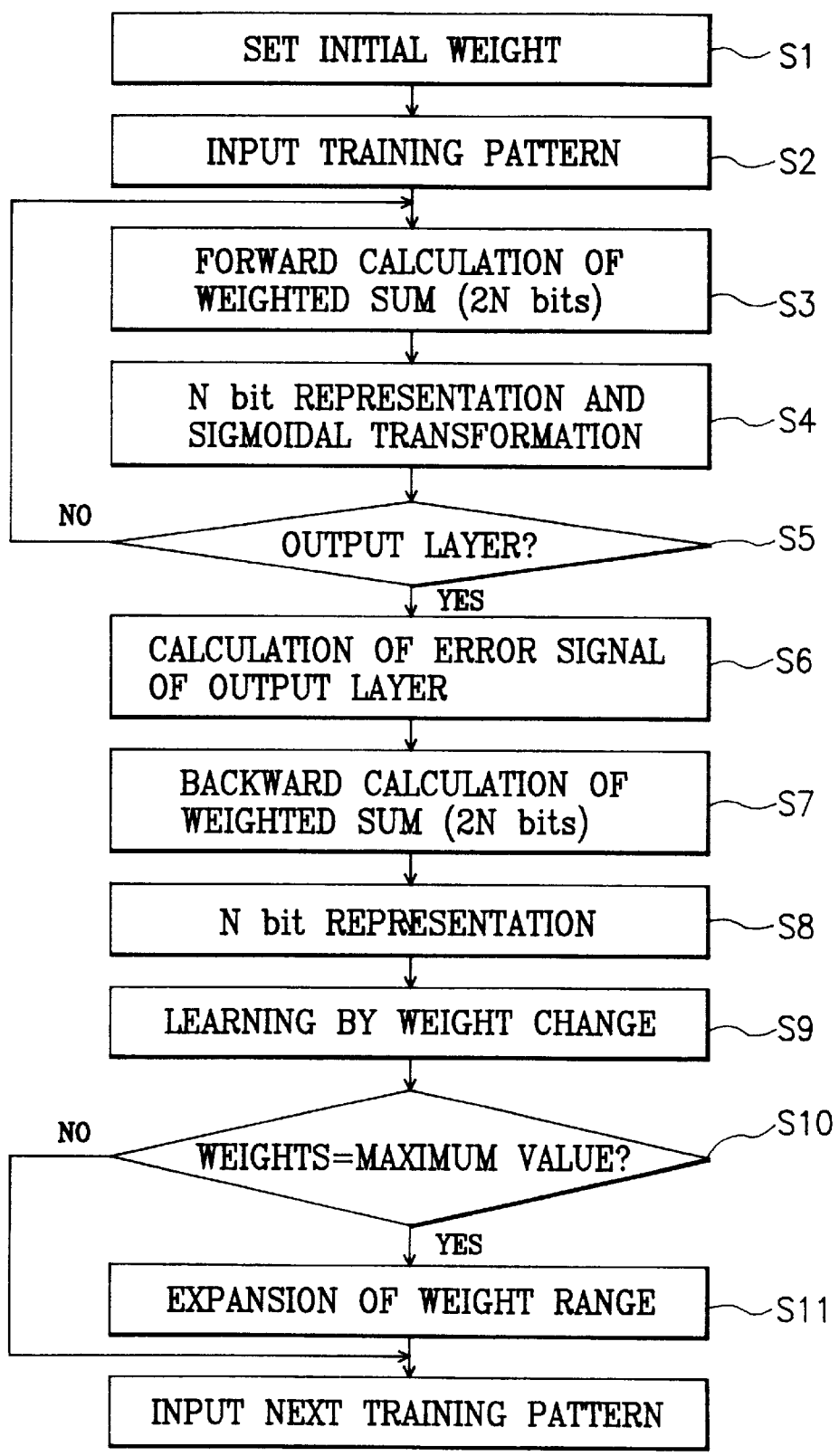
FIG. 4 is a flowchart showing a learning method of Multilayer Perceptrons with N-bit data representation, according to an embodiment of the present invention.

The learning method according to the present invention using the above equations, as shown in FIG. 4, includes the steps of initializing the Multilayer Perceptron with small weights enough to avoid premature saturation of learning (step 1), presenting a training pattern to the Multilayer Perceptron after performing the step 1 (step 2), calculating a weighted sum with 2N-bit data precision in forward propagation of node values (step 3), converting the results of weighted sums calculated in the step 3 into ones with N-bit precision and obtaining the sigmoid transformation of the N-bit data to determine the node values in each layer (step 4), determining whether node values in the output layer are generated (step 5), calculating the error signal of the output layer according to the cross-entropy error function if the node values of output layer are determined in the step 5 (step 6), calculating a weighted sum with 2N-bit data precision in error back-propagation procedure (step 7), converting the results of weighted sums calculated in the step 7 into ones with N-bit precision (step 8), updating weights in each layer according to the error signal of the step 6 and 8 (step 9), determining whether the weights updated by step 9 reaches the maximum value of the weights in each layer (step 10) and expanding the weight range if 1% of the updated weights reaches the maximum value of the weights in each layer in the step 10 (step 11), and presenting a next training pattern to the Multilayer Perceptron.

According to the above-described method, a Multilayer Perceptron with 144 input nodes, 30 hidden nodes in one hidden layer, and 10 output nodes is trained to classify handwritten digits.

Figure 5A:
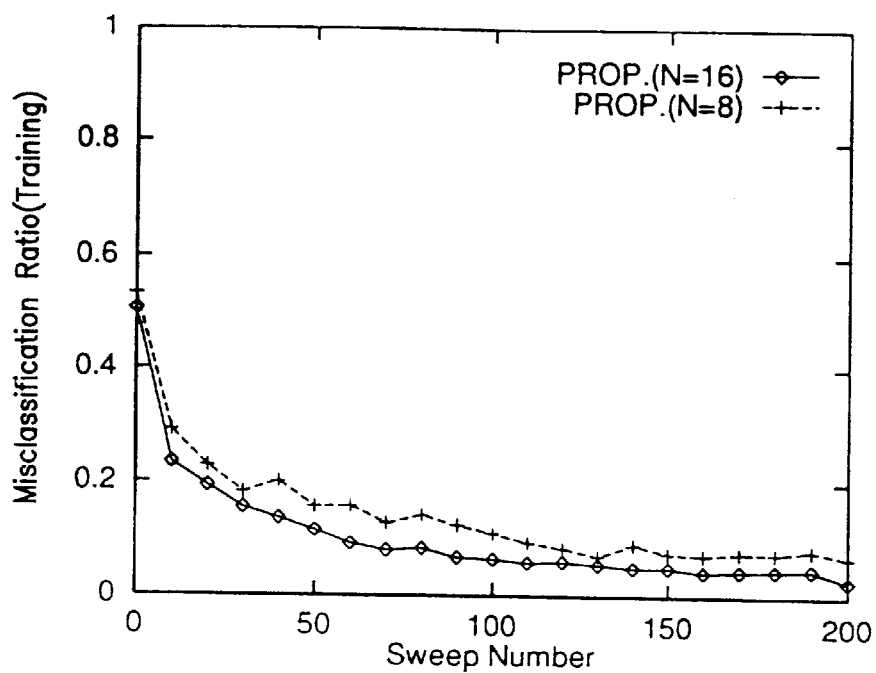
Figure 5B:
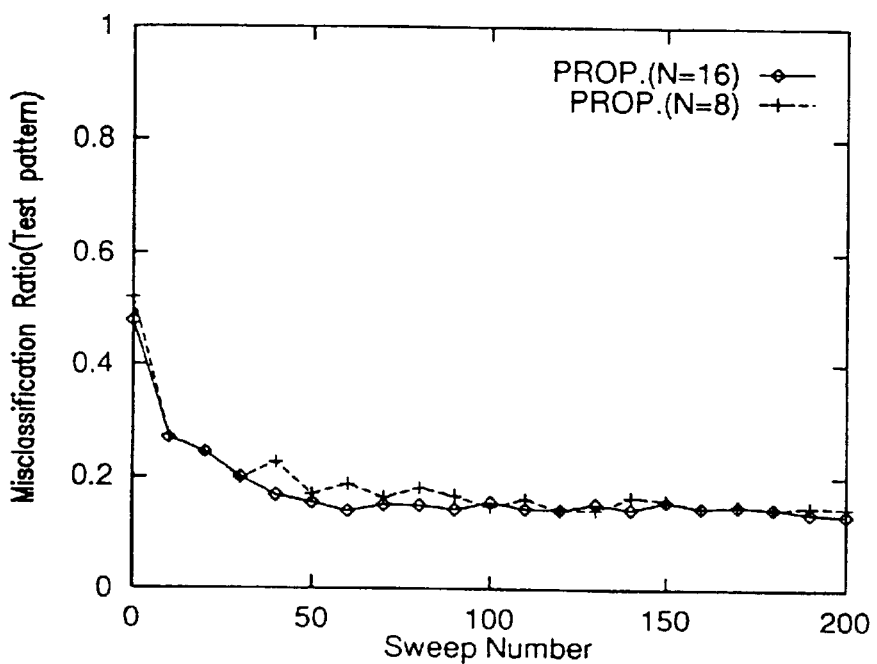

After simulations of four times, FIGS. 5A and 5B show the average of classification ratios for training patterns and test patterns using 16-bit data precision and those using 8-bit data precision, respectively. As shown in FIG. 5, it is understood that the classification ratios of 96.0% and 86.3% each for the training patterns and test patterns in case of N=8 (8-bit data precision) are similar to those in case of N=16 (16-bit data precision).

As described above, the present invention improves the performance of Multilayer Perceptron with 8-bit data precision to that with 16-bit data precision. Thus, the system cost for implementing the Multilayer Perceptron with fixed-point digital hardware will be reduced drastically.

What is claimed is:

1. A learning method for a multilayer perceptron neural network having N-bit data representation wherein N is an integer and wherein input pattern signals, inter-node weight signals error signals in each layer and note state signals in each layer are represented by digital signals having N-bit precision, said method comprising the steps of:

(i) inputting training digital signals representing a training pattern;

(ii) performing a digital forward calculation process generating a weighted sum signal using weight and node state signals of a lower layer and then performing a sigmodial transform of the weighted sum signal to produce node state signal in each layer;

(iii) generating an error signal for an output layer;

(iv) generating back propagated error signals wherein a further weighted sum signal is generated using weight and error signals of an upper layer; and (v) training the multilayer perceptron with N-bit data precision by changing weights and repeatedly performing the above steps (i)–(iv)

said weighted sum signals having 2N-bit data precision during said forward and back propagated steps (ii) and (iv)

wherein the maximum value of a weighted sum converted into N bit precision is set to a value in a saturated region of a sigmoidal transformation when the result of the weighted sum having 2N-bit data precision in the forward calculation of the multilayer perceptron is converted into one with N-bit precision for a sigmoidal nonlinear transformation of the weighted sum to generate the node state signal.

2. A learning method for a multilayer perceptron neural network with N-bit data representation as in claim 1, wherein the maximum value of back propagated signal converted to N-bit precision is set to a value relatively smaller than that represented with 2N-bit precision when the 2N-bit back propagated weighted sum having 2N-bit data precision in said backward calculation of said multilayer perceptron is represented with N-bit data between weight and error signals of an upper layer are converted into one with N-bit precision for updating a weight signal in proportion to the back propagated error signal.

3. A learning method for a multilayer perceptron neural network with N-bit data representation as in claim 1, wherein the maximum value of weight signals which can be represented with N-bit precision in the initial stage of learning is expanded if a predetermined ratio of the weights becomes the maximum value during the learning progress.

4. A learning method for a multilayer perceptron neural network with N-bit data representation, N being an integer, said method comprising the steps of:

(i) setting an early weight for avoiding premature saturation of learning;

(ii) presenting N-bit digital training pattern signals to a multilayer perceptron after performing step (i);

(iii) generating weighted sum signals with 2N-bit data precision in a forward calculation process of a multilayer perceptron;

(iv) converting the results of said 2N-bit weighted sum from step (ii) into N-bit data for sigmoidal nonlinear transformation;

(v) determining whether an error signal of an output layer is generated;

(vi) generating said error signal for said output layer if said error signal is generated in step (v);

(vii) generating weighted sum signals with 2N-bit data precision in a back propagation of error signals in said multilayer perceptron;

(viii) converting the weighted sum signals from step (vii) into N-bit data signals;

(ix) changing weight signals according to said error signals of steps (vi) and (viii) to represent learning for said training pattern;

(x) determining whether the weight signals from step (ix) reach the maximum value of weight signals in each layer; and (xi) expanding the range of weight signals being utilized to generate error signals if a predetermined portion of said weight signals reach said maximum value of the weight signals of said respective layers in step (x) and then presenting a next resultant training pattern to repeat step (ii) and the steps following thereafter.

5. In an improved method of training an N-bit multilayer perceptron neural network where N is an integer representing the number of bits in digital network input pattern signals, node state signals, weighting signals and error signals, the improvement comprising during a network training process:

generating enhanced precision weighted sum signals having more than N-bit precision while deriving enhanced precision error signals in response to input pattern signals; and converting the resulting enhanced precision error signals back to N-bit precision for use in modifying the weight signals of the network during the training process;

wherein the maximum value of a weighted sum converted into N-bit precision is set to a value in a saturated region of a sigmoidal transformation when the result of the weighted sum having enhanced data precision in the forward calculation of the multilayer perceptron is converted into one with N-bit precision for a sigmoidal nonlinear transformation of the weighted sum to generate the node state signal.

6. In an improved method of training an N-bit multilayer perceptron neural network where N is an integer representing the number of bits in digital network input pattern signals, node state signals, weighting signals and error signals, the improvement comprising during a network training process:

generating enhanced precision weighted sum signals having more than N-bit precision while deriving enhanced precision error signals in response to input pattern signals; and converting the resulting enhanced precision error signals back to N-bit precision for use in modifying the weight signals of the network during the training process;

wherein the maximum value of back propagated signal converted to N-bit precision is set to a value relatively smaller than that represented with 2N-bit precision when the enhanced precision back propagated weighted sum is represented with N-bit data between weight and error signals of an upper layer are converted into one with N-bit precision for updating a weight signal in proportion to the back propagated error signal.

7. In an improved method of training an N-bit multilayer perceptron neural network where N is an integer representing the number of bits in digital network input pattern signals, node state signals, weighting signals and error signals, the improvement comprising during a network training process:

generating enhanced precision weighted sum signals having more than N-bit precision while deriving enhanced precision error signals in response to input pattern signals; and converting the resulting enhanced precision error signals back to N-bit precision for use in modifying the weight signals of the network during the training process;

wherein the maximum value weight signals which can be represented with N-bit precision in the initial stage of learning is expanded if a predetermined ratio of the weights becomes the maximum value during the learning progress.

* * * * *